United States Patent
Hutchins et al.

(10) Patent No.: US 7,639,444 B2
(45) Date of Patent: Dec. 29, 2009

(54) REAL-TIME CHANNEL ADAPTATION

(75) Inventors: Robert Allen Hutchins, Tucson, AZ (US); Glen Alan Jaquette, Tucson, AZ (US); David Berman, San Jose, CA (US); Constantin Michael Melas, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 10/737,563

(22) Filed: Dec. 15, 2003

(65) Prior Publication Data

US 2005/0144534 A1   Jun. 30, 2005

(51) Int. Cl.
*G11B 5/09* (2006.01)
*G11B 5/035* (2006.01)
*H04L 27/10* (2006.01)
*H04L 27/18* (2006.01)
*G11C 29/00* (2006.01)

(52) U.S. Cl. .............................. 360/53; 360/46; 360/65; 375/232; 375/233; 714/718

(58) Field of Classification Search .................. 714/710, 714/45, 718, E11.036; 365/201, 200
See application file for complete search history.

(56) References Cited

U.S. PATENT DOCUMENTS

| | | | |
|---|---|---|---|
| 5,132,988 A * | 7/1992 | Fisher et al. ................. | 375/233 |
| 5,727,074 A | 3/1998 | Hildebrand | |
| 5,805,619 A | 9/1998 | Gardner et al. | |
| 5,825,744 A * | 10/1998 | Hutchins et al. ........... | 369/59.2 |
| 5,970,092 A | 10/1999 | Currivan | |
| 5,987,634 A * | 11/1999 | Behrens et al. ............. | 714/719 |
| 6,005,731 A * | 12/1999 | Foland et al. ................. | 360/53 |
| 6,222,592 B1 | 4/2001 | Patel | |
| 6,278,747 B1 * | 8/2001 | Hutchins et al. ............ | 375/340 |
| 6,449,110 B1 | 9/2002 | DeGroat et al. | |
| 6,480,349 B1 * | 11/2002 | Kim et al. ...................... | 360/27 |
| 7,106,533 B2 * | 9/2006 | Eleftheriou et al. ........... | 360/39 |
| 7,212,482 B2 * | 5/2007 | Howarth et al. .......... | 369/59.15 |
| 7,271,971 B2 * | 9/2007 | Hutchins et al. .............. | 360/65 |

FOREIGN PATENT DOCUMENTS

WO    WO 01/15400 A2    3/2001

* cited by examiner

*Primary Examiner*—Kevin L Ellis
*Assistant Examiner*—Daniel F McMahon
(74) *Attorney, Agent, or Firm*—Janaki K. Davda; Konrad Raynes & Victor LLP

(57) ABSTRACT

Disclosed is a technique for updating a read-detect channel. A signal is processed in a read-detect channel that has one or more programmable registers. While signals continue to be processed by the read-detect channel, it is determined with a channel auxiliary processor whether to dynamically replace values of the one or more programmable registers. When it is determined that values of the one or more programmable registers are to be replaced, a channel auxiliary processor determines values for the one or more programmable registers and replaces existing values for the one or more programmable registers with the determined values.

16 Claims, 10 Drawing Sheets

REAL-TIME CHANNEL ADAPTATION

BACKGROUND OF THE INVENTION

1. Field of the Invention

The present invention relates to real-time adaptive equalization and real-time modification of read-detect channel parameters based upon signals received from a data storage device.

2. Description of the Related Art

Automated media storage libraries are known for providing cost effective access to large quantities of stored media. Generally, media storage libraries include a large number of storage slots in which are stored portable data storage media The typical portable data storage media is a tape cartridge, an optical cartridge, a disk cartridge, electronic storage media, and the like. The term "electronic storage media" may be described as a device such as a PROM, EPROM, EEPROM, Flash PROM, compactflash, smartmedia, and the like.

In conventional data storage systems, a read-detect channel is the part of a storage device that is used to process analog waveforms (also referred to as "analog signals") received from the portable data storage media to generate digital waveforms (also referred to as "digital signals") that can be used by a host computer. In such conventional data storage systems, a digital waveform from the read-detect channel does not go directly to the host processor. Instead, the digital waveform goes directly to a data flow processor, which removes formatting information and corrects errors, reconstructing an exact copy of the host computer data that was originally written on the portable data storage medium.

For many data storage systems, there is great variability in the properties of the portable data storage media and in the data storage systems themselves. Typically, there are many types of storage media manufactured by several different companies that may be read. Likewise, the storage media may be written on a data storage system that is written by one manufacturer and read by a data storage system that is made by another manufacturer. This requires a read-detect channel that is adaptable and has many programmable components that can be changed or optimized, depending upon the characteristics of the waveforms that are read from the portable data storage media.

In conventional data storage systems, there are many components of the read-detect channel that can be changed or optimized. One such component is an equalizer. The equalizer is usually one of the first components that processes the waveform as the waveform is read from the portable data storage media. Typically, the equalizer is a finite impulse response ("FIR") filter that has several programmable "taps" that may be programmed depending upon the properties of the portable data storage media. By correctly programming the FIR "taps", a FIR filter shapes a received digital waveform to produce another waveform that has desirable properties for further data detection.

In conventional data storage devices, the read-detect channel and the data flow are "intelligent" devices that monitor the signal processing effort required to detect the data on the portable data storage media The read-detect channels monitor waveform characteristics such as the signal amplitude, the data frequency, and the signal-to-noise ratio ("SNR"). The read-detect channel sends this information to the tape drive processor, which can dynamically update read-detect channel control registers. Likewise, the data-flow monitors error conditions in the received data stream and similarly sends this information to the tape drive processor, which can update data-flow control registers.

However, data storage system management tasks associated with controlling the motion of the media and the flow of the data typically require too much processor time to allow read-detect channel components to be optimized as the data is being read. This means that even though information about the quality of the received signal is available as the data is being read, a data storage system manager is too busy performing other processing to modify and update the read-detect channel. When the quality of the received signal degrades to the point where the original data cannot be recovered without errors, the data processing is stopped, the control registers are interrogated, and changes are made to the read-detect channel to improve data detection. This may include redesigning the FIR filter tap or changing other read-detect channel parameters.

In a data storage device, it is undesirable to stop the data processing due to errors. If an uncorrectable error occurs, the data storage system must disrupt the flow of data and physically control the motion of the portable data storage media in the data recovery process. For a tape recording system, this involves stopping the tape, rewinding to a position before the error and trying again. For a disk system, this involves waiting until the disk turns a full rotation before the error region can be re-read. This interruption to the flow of data significantly reduces the overall data rate of the device.

Therefore, there is a need in the art for improved real-time adaptive read-detect channel optimization.

SUMMARY OF THE INVENTION

Provided are a method, system, and computer program product for updating a read-detect channel. A signal is processed in a read-detect channel that has one or more programmable registers. While signals continue to be processed by the read-detect channel, it is determined with a channel auxiliary processor whether to dynamically replace values of the one or more programmable registers. When it is determined that values of the one or more programmable registers are to be replaced, a channel auxiliary processor determines values for the one or more programmable registers and replaces existing values for the one or more programmable registers with the determined values.

In further implementations, the determined values for the one or more programmable registers are determined using a sample of the signal.

In additional implementations, the channel auxiliary processor receives error information for the signal and determines whether to replace values of the one or more programmable registers with stored values based on the error information.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention allow read-detect channel parameters, such as equalization, in a data storage and retrieval system (e.g., a multi-track tape subsystem) to be adaptively changed as a data storage device (e.g., a tape drive) is reading data from a data storage medium (e.g., a tape). Certain implementations of the invention allow for the calculation of FIR coefficients using matrix inversion techniques or a Least Mean Squares (LMS) algorithm from first digital signal data stored in a Static Random Access Memory (SRAM) buffer. Certain implementations of the invention allow for loading the FIR coefficients from default registers, in which initial FIR coefficients are stored. Certain implementations of the invention allow for the transfer of FIR equalizer tap values from registers where known effective FIR equalizer taps are stored based upon information received from the read-detect channel or a data flow. That is, when current FIR equalizer tap values are not effectively processing a signal, the stored FIR equalizer tap values may be used to replace the ineffective ones. Certain implementations of the invention allow channel parameters, such as the base target channel, the PLL bandwidth, gain values, etc. to be dynamically changed in non data areas of the received data based upon information received from the read-detect channel, the data-flow, and/or a system processor. Although examples herein may refer to FIR taps, the techniques of the invention are applicable to any type of programmable registers.

Figure 1:
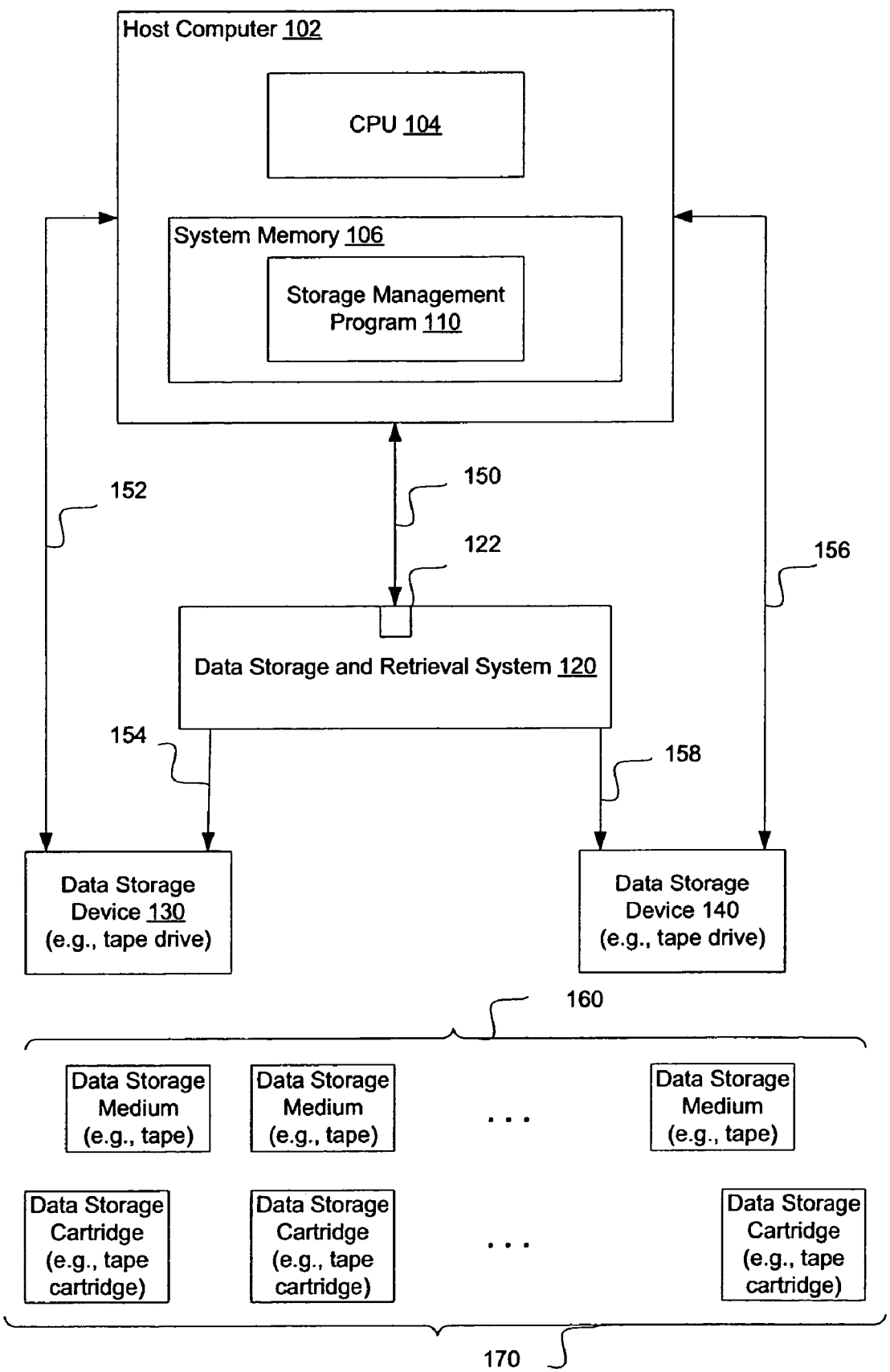
FIG. 1 illustrates, in a block diagram, a computing environment in accordance with certain implementations of the invention.

FIG. 1 illustrates, in a block diagram, a computing environment in accordance with certain implementations of the invention. A host computer. 102 includes at least one central processing unit (CPU) 104 and system memory 106. System memory 106 may be implemented in volatile and/or non-volatile devices. An application, such as a storage management program 110 that optimizes storage utilization, executes in system memory 106. The storage management program 110 may be implemented either as a standalone application or as a part of one or more other applications. In certain implementations, host computer 102 comprises a single computer. The host computer 102 may comprise any computing device known in the art, such as a mainframe, server, personal computer, workstation, laptop, handheld computer, telephony device, network appliance, virtualization device, storage controller, etc. In certain implementations, host computer 102 comprises one or more mainframe computers, one or more work stations, one or more personal computers, combinations thereof, and the like.

Information is transferred between the host computer 102 and secondary storage devices managed by a data storage and retrieval system, such as data storage and retrieval system 120, via communication links 150, 152, and 156. Communication links 150, 152, and 156, may comprise a serial interconnection, such as an RS-232 cable or an RS-422 cable, an ethernet interconnection, a Small Computer System Interface (SCSI) interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, combinations thereof, and the like.

In the implementation shown in FIG. 1, data storage and retrieval system 120 includes data storage devices 130, 140. In certain implementations, data storage devices 130, 140 are tape drives. In certain other implementations, data storage devices 130, 140 are hard-disk drives or optical-disk drives. In certain implementations, data storage and retrieval system 120 includes a single data storage device. In alternative implementations, data storage and retrieval system 120 includes more than two data storage devices.

In systems with portable storage, media 160 (e.g., tapes, hard-disks or optical disks) may be moveably disposed within the data storage and retrieval system 120. In certain implementations, the storage media 160 are housed in portable data storage cartridges 170 (e.g., tape cartridges). Each of such portable data storage cartridges 170 may be removably disposed in an appropriate data storage device 130, 140.

Data storage and retrieval system 120 may include program logic to manage data storage devices 130, 140 and portable data storage cartridges 170. In certain implementations, each data storage device includes a controller comprising such program logic.

In alternative implementations, data storage and retrieval system 120 and host computer 102 may be collocated on a single apparatus. In this case, host computer 102 may be connected to another host computer to, for example, translate one set of library commands or protocols to another set of commands/protocols, or to convert library commands from one communication interface to another, or for security, or for other reasons.

Data storage and retrieval system 120 comprises a computer system, and manages, for example, drives and cartridges. In such drive implementations, drives 130, 140 may be any suitable tape drives known in the art, e.g., the TotalStorage™ 1590 tape drives (TotalStorage is a trademark of IBM Corporation). Similarly, cartridges 170 may be any suitable tape cartridge device known in the art, such as ECCST, Magstar, TotalStorage™ 1420, 1480, 1490E, 1580, 1590 tape cartridges, etc.

Figure 2:
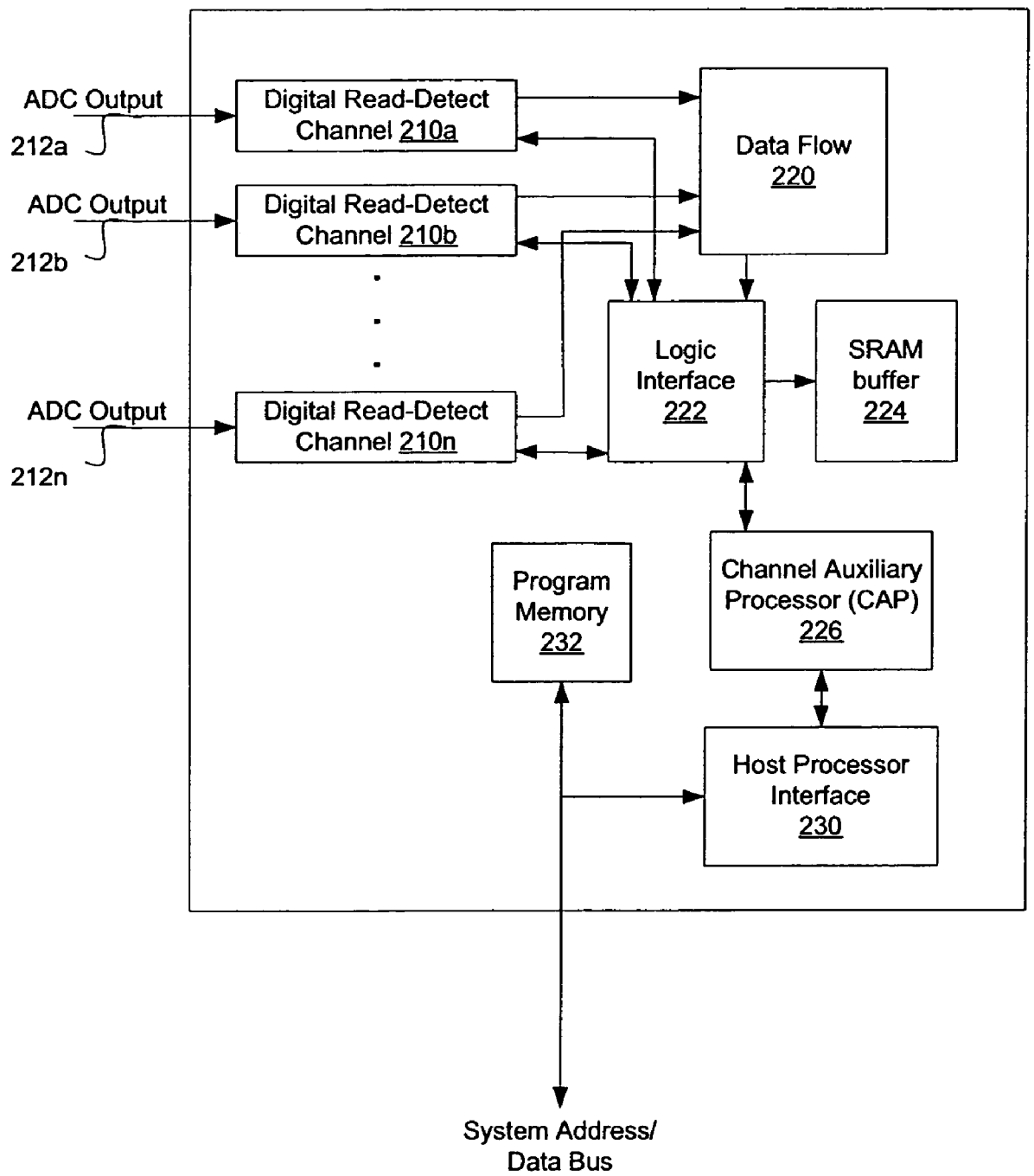
FIG. 2 illustrates a multi-track read-detect channel and data flow in accordance with certain implementations of the invention.

FIG. 2 illustrates a multi-track read-detect channel and data flow in accordance with certain implementations of the invention. For ease of reference, multiples of a same element will be referenced with a common reference number and a suffix of "a", "b", or "n", along with ellipses (e.g., multiple digital read-detect channels are referred to as 210a, 210b, . . . 210n). The architecture of FIG. 2 may be included in data storage devices 130, 140. Analog to Digital Converter (ADC) output 212a, 212b, . . . 212n provides a first digital signal as input to digital read-detect channels 210a, 210b, . . . 210n, respectively. In particular, each ADC converts an analog waveform read from a data storage medium 160 to a first digital signal, and this first digital signal is passed as input to the digital read-detect channels 210a, 210b, . . . 210n. That is, the data received from a data storage medium 160 is an analog waveform that is not directly processed in a digital computing system.

Each digital read-detect channel 210a, 210b, ... 210n includes various components, including an equalizer, a phase-locked loop (PLL), and data detector. In order to correctly detect the first digital signal, the equalizer re-shapes the first digital signal so that a resulting second digital signal has pre-defined signal characteristics. These pre-defined signal characteristics are defined by a "target channel." Typical "target channels" include, for example, a Partial Response (PR) target channels, such as a PR4 target channel or an EPR4 target channel, or a Noise Predictive Maximum Likelihood (NPML) target channel. Such target channels are well known in the art.

The first digital signal is processed by a read-detect channel 210a, 210b, ... 210n and is forwarded to data flow 220 as a second digital signal. The digital read-detect channel 210a, 210b, ... 210n processes the first digital signal and determines the second digital signal of ones and zeroes that were originally written to the data storage medium 160. The ones and zeroes are passed to the data flow 220.

Data flow 220 performs processing on the second digital signal so that the second digital signal may be processed by a host computer. For example, data flow 220 removes tape formatting features from the data, such as modulation encoding and fixed fields (e.g., DSS and VFO), and corrects any errors in the data. Data flow 220 also reformats the data for transmission to the host computer according to a SCSI or Fibre channel protocol.

In certain implementations, a Channel Auxiliary Processor (CAP) 226 may be a sequencer, a Digital Signal Processor (DSP) core, or a microprocessor core that is interfaced to the digital read-detect channels 210a, 210b, ... 210n, the SRAM buffer 224, and the data flow 224 via the logic interface 222. A sequencer may be described as a simple microprocessor architecture that implements a small, limited set of instructions. The channel auxiliary processor 226 receives status and processing information from the digital read-detect channels 210a, 210b, ... 210n and data flow 224 and stores samples from the first digital signals of digital read-detect channels 210a, 210b, ... 210n in SRAM buffer 224.

In certain implementations, the SRAM buffer 224 is used to store first digital signals from digital read-detect channels 210a, 210b, ... 210n for later equalizer design by the channel auxiliary processor 226. In certain implementations, the SRAM buffer 224 may simultaneously store samples from each one of multiple digital read-detect channels 210a, 210b, ... 210n. In certain alternative implementations, the SRAM buffer 224 may store samples for one digital read-detect channel 210a, 210b, ... 210n at a time. Whether the SRAM buffer 224 is used to store samples for one digital read-detect channel 210a, 210b, ... 210n at a time or for multiple digital read-detect channels 210a, 210b, ... 210n simultaneously may depend on the equalizer optimization technique being used by the channel auxiliary processor 226.

When the SRAM buffer 224 is filled with sampled data, the channel auxiliary processor 226 takes the sampled data from SRAM buffer 224 and designs a new equalizer (using various techniques, such as the LMS algorithm or matrix inversion techniques that are well known in the art). For example, the channel auxiliary processor 226 may use the LMS algorithm or matrix inversion techniques to design FIR coefficients (i.e., FIR filter taps) from data stored in the SRAM buffer 224. The coefficients equalize the first digital signal to match a pre-defined target channel. The coefficients are updated through the logic interface 222.

The logic interface 222 is used to pass data between the digital read-detect channels 210a, 210b, ... 210n, the data flow 220, the SRAM buffer 224, and channel auxiliary processor 226. The logic interface 222 may be described as a "glue" block that connects the appropriate digital signals from the digital read-detect channels 210a, 210b, ... 210n, the data flow 220, and the SRAM buffer 224 to the channel auxiliary processor 226.

Figure 3:
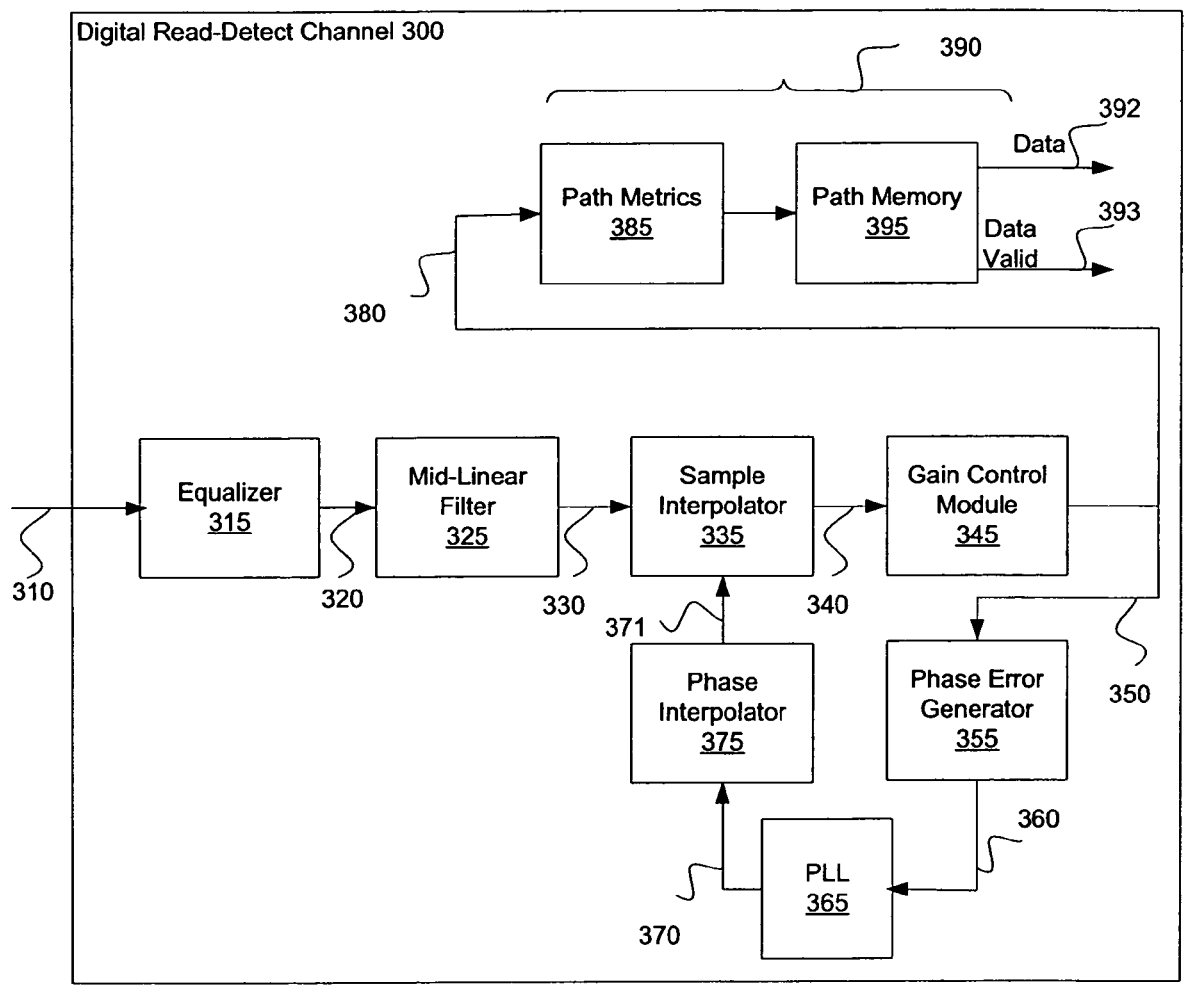
FIG. 3 illustrates an architecture of an asynchronous digital read-detect channel assembly when used in a tracking mode in accordance with certain implementations of the invention.
Figure 4:
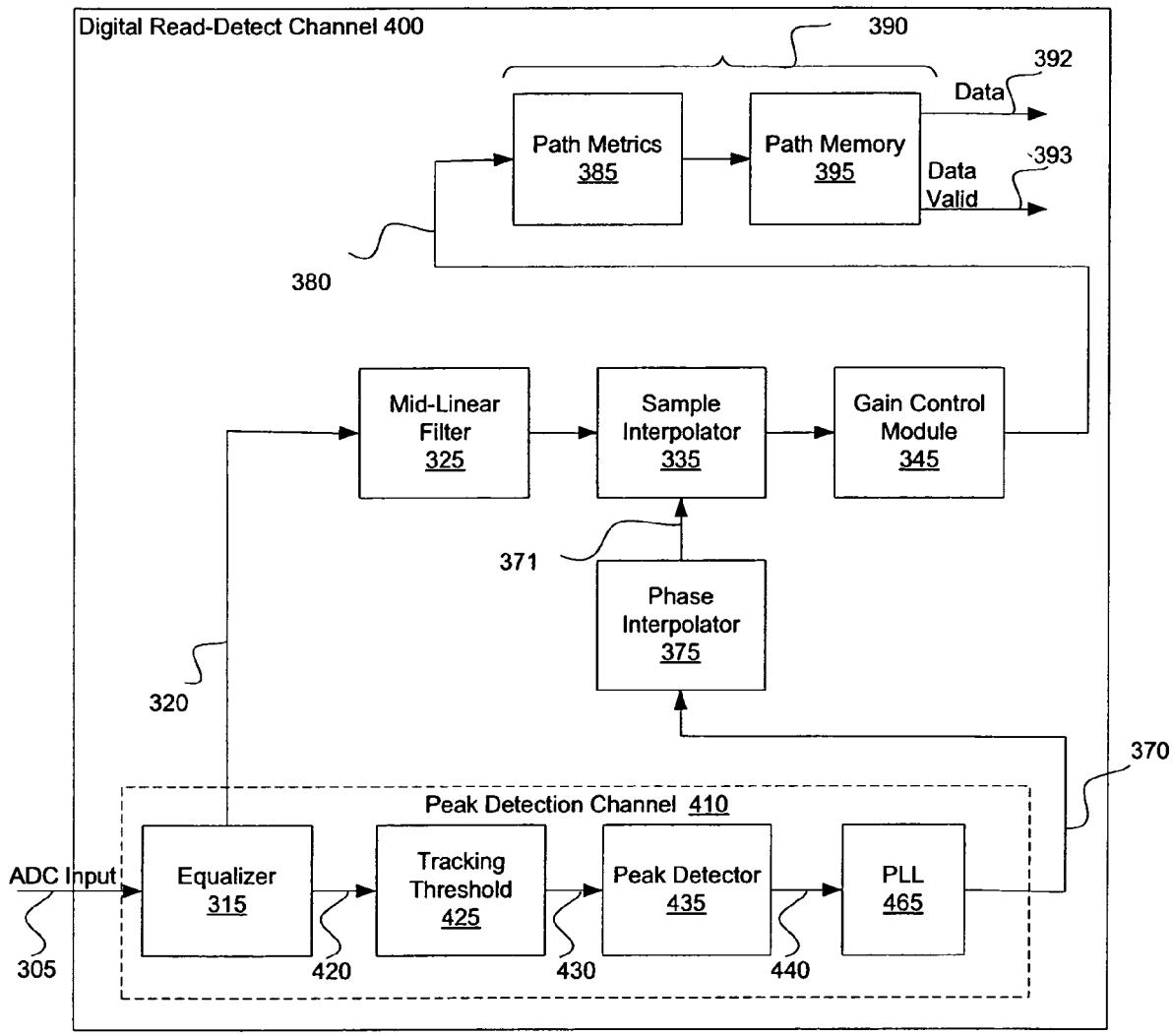
FIG. 4 illustrates an architecture of an asynchronous digital read-detect channel assembly when used in a "peak detection" or acquisition mode in accordance with certain implementations of the invention.

FIGS. 3 and 4 illustrate further details of digital read-detect channels 300 and 400, respectively, in accordance with certain implementations of the invention. FIGS. 3 and 4 illustrate examples of digital read-detect channels 300, 400, but implementations of the invention may be used with any type of digital read-detect channel, such as one having fewer or more components than those illustrated in FIGS. 3 and 4.

In particular, FIG. 3 illustrates an architecture of an asynchronous digital read-detect channel assembly 300 when used in a tracking mode in accordance with certain implementations of the invention. In certain implementations, FIG. 3 comprises an asynchronous digital read-detect channel using a partial response maximum likelihood ("PRML") mode. In the illustrated implementation of FIG. 3, an asynchronous digital read-detect channel assembly includes equalizer 315, mid-linear filter 325, sample interpolator 335, gain control module 345, phase-error generator 355, Phase Locked Loop (PLL) circuit 365, phase interpolator 375, path metrics module 385, and path memory 395. In certain implementations, path metrics module 385 in combination with path memory 395 comprises an assembly known as a maximum likelihood detector, such as maximum likelihood detector 390.

When reading information from magnetic tape using a read head (not shown) of a media device, a first digital signal comprising that information is formed from an analog waveform. The first digital signal is provided to equalizer 315 using communication link 310. In certain implementations, equalizer 315 comprises a finite impulse response ("FIR") filter. Such a FIR filter shapes the first digital signal to produce a second digital signal.

The second digital signal formed in equalizer 315 is provided to mid-linear filter 325 using communication link 320. Mid-linear filter 325 determines the value of the equalized signal (i.e., the second digital signal) at the middle of the sample cell. Mid-linear filter 325 produces a third signal which includes the equalized signal and the value of the equalized signal at the middle of the sample cell.

The third signal formed in mid-linear filter 325 is provided to sample interpolator 335 via communication link 330. Sample interpolator 335 receives the third signal from mid-linear filter 325 and using the output of PLL circuit 365 estimates the equalized signal at the synchronous sample time. Synchronous sample time may be described as the time when the bit cell clock arrives. PLL circuit 365 provides this time. Sample interpolator 335 provides one or more fourth digital, synchronous signals.

The one or more fourth digital, synchronous signals formed by sample interpolator 335 are provided to gain control module 345 via communication link 340. Gain control module 345 adjusts the amplitude of the one or more fourth digital, synchronous signals to form one or more fifth signals having amplitudes set to preset levels required by the maximum likelihood detector 390. In the illustrated implementation, the maximum likelihood detector 390 comprises path metrics module 385 and path memory 395. The one or more fifth signals are provided to maximum likelihood detector 390 via communication link 380. The output of the maximum likelihood detector is data on communication link 392 and a data valid signal on communication link 393.

The tracking mode of FIG. 3, includes a feedback loop comprising phase error generator 355, PLL circuit 365, and phase interpolator 375. The one or more fifth signals formed by gain control circuit 345 are provided to phase-error generator 355 via communication link 350. Phase-error generator 355 estimates the phase of the one or more fifth signals and generates an error signal that is provided to PLL circuit 365 via communication link 360.

The phase-error is processed by PLL circuit 365 which filters the phase-error and determines the locations of the synchronous bit cell boundaries. The locations of the synchronous bit cell boundaries are provided to phase interpolator 375 and sample interpolator 335 via communication links 370 and 371, respectively.

FIG. 4 illustrates an architecture of an asynchronous digital read-detect channel assembly 400 when used in a "peak detection" or acquisition mode in accordance with certain implementations of the invention. In FIG. 4, a digital read-detect channel includes peak detection channel 410 comprising equalizer 315, tracking threshold module 425, peak detector 435, and PLL circuit 465. Equalizer 315 provides the second digital signal to tracking threshold module 425 via communication link 420, and to mid-linear filter 325 via communication link 320. Tracking threshold module 425 derives a positive and negative threshold level where those threshold levels comprise some fraction of the average peak level. The tracking threshold module 425 provides these thresholds to the peak detector 435 along with the equalized signal from the equalizer 315 via communication link 430.

Peak detector 435 determines the locations of the "1"s in the data stream. A "1" occurs if there is a peak and the peak amplitude, either positive or negative, is greater than a positive threshold, or less than a negative threshold, provided by the tracking threshold module 425. Peak detector 435 provides a signal representing the location of the peak and a peak-detected qualifier to the PLL circuit 465 via communication link 440. PLL circuit 465 is interconnected with phase interpolator 375 (FIG. 3) as described above.

In the peak detection or acquisition mode shown in FIG. 4, an asynchronous digital read-detect channel does not include a feedback loop from the gain control module 345 to a phase-error generator 355 (FIG. 3), PLL circuit 465 (FIG. 3), phase interpolator 375 (FIG. 3), and sample interpolator 335 (FIG. 3). This architecture allows a fast acquisition mode, i.e. peak detection mode, wherein the PLL circuit is rapidly "locked," and the gain adjusted. "Locking" the PLL circuit may be described as locking onto the phase and frequency of the first digital signal comprising the data read from one or more tape channels, and then defining the bit cell boundaries separating individual data bits.

Figure 5:
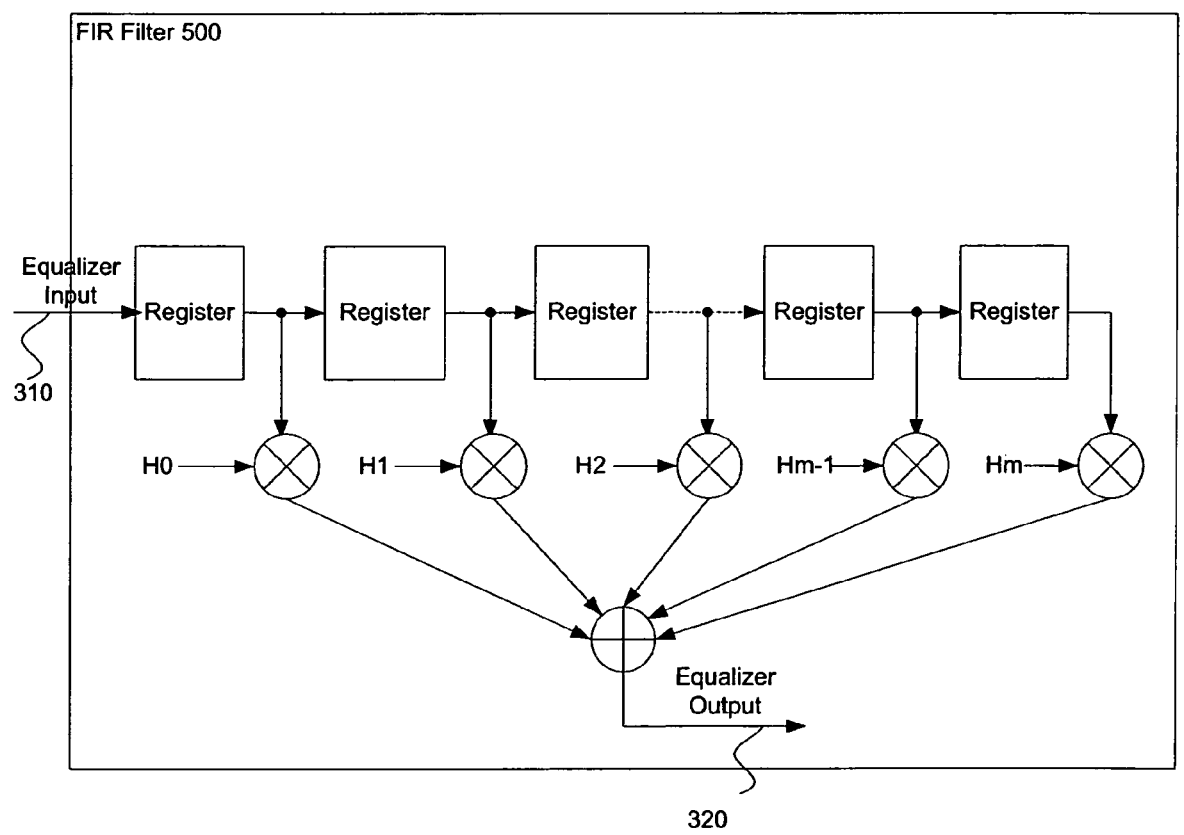
FIG. 5 illustrates a FIR filter in accordance with certain implementations of the invention.

FIG. 5 illustrates a FIR filter 500 in accordance with certain implementations of the invention. In the illustration of FIG. 5, equalizer 315 is a FIR filter 500 that includes m programmable taps (i.e., a type of programmable registers). The equalizer input 310 of equalizer 315 is the first digital signal, and the equalizer output 320 of equalizer 315 is a shaped and filtered waveform (i.e., the second digital signal). In particular, each stage of a FIR filter 500 is computed within one tap. A tap may consist of a loadable coefficient register along with two input registers, a multiplier, an adder, and an output register. In FIG. 5, the loadable coefficient registers are labeled H0 through Hm. The FIR filter 500 computes a weighted sum by performing a series of multiply operations on the first digital signal. The first digital signal is delayed through a string of buffers. The output of each buffer is multiplied by a FIR tap coefficient and sequentially added to the product of each of the buffers and the array of FIR tap coefficients. In certain implementations of the invention, the FIR taps may be dynamically adjusted directly in hardware by using the LMS algorithm or other adaptive equalization techniques. In certain implementations, the channel auxiliary processor 226 may store the tap values (e.g., in SRAM buffer 224) after a successful read operation for use as initial coefficients later.

Although the equalizer 315 is a component that is dynamically adjusted as data is being read, in a digital read-detect channel, many of the components may be adjusted dynamically. For example, a Mid-Linear Filter 325, a Gain Control Module 345, PLL 365, 465, and Tracking Threshold 425 may be adjusted dynamically by implementations of the invention.

Figure 6A:
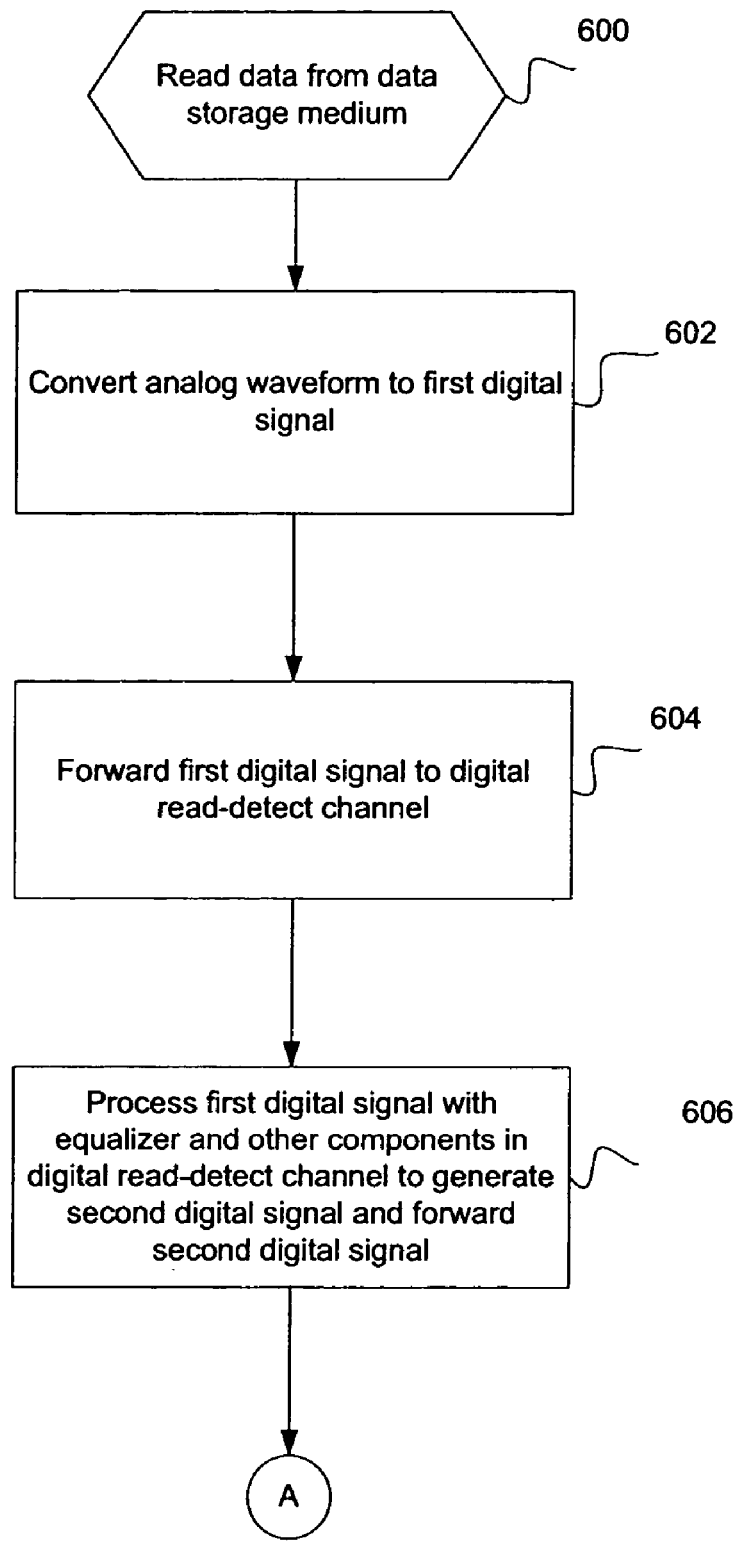
FIGS. 6A and 6B illustrate logic for updating a digital read-detect channel in accordance with certain implementations of the invention.
Figure 6B:
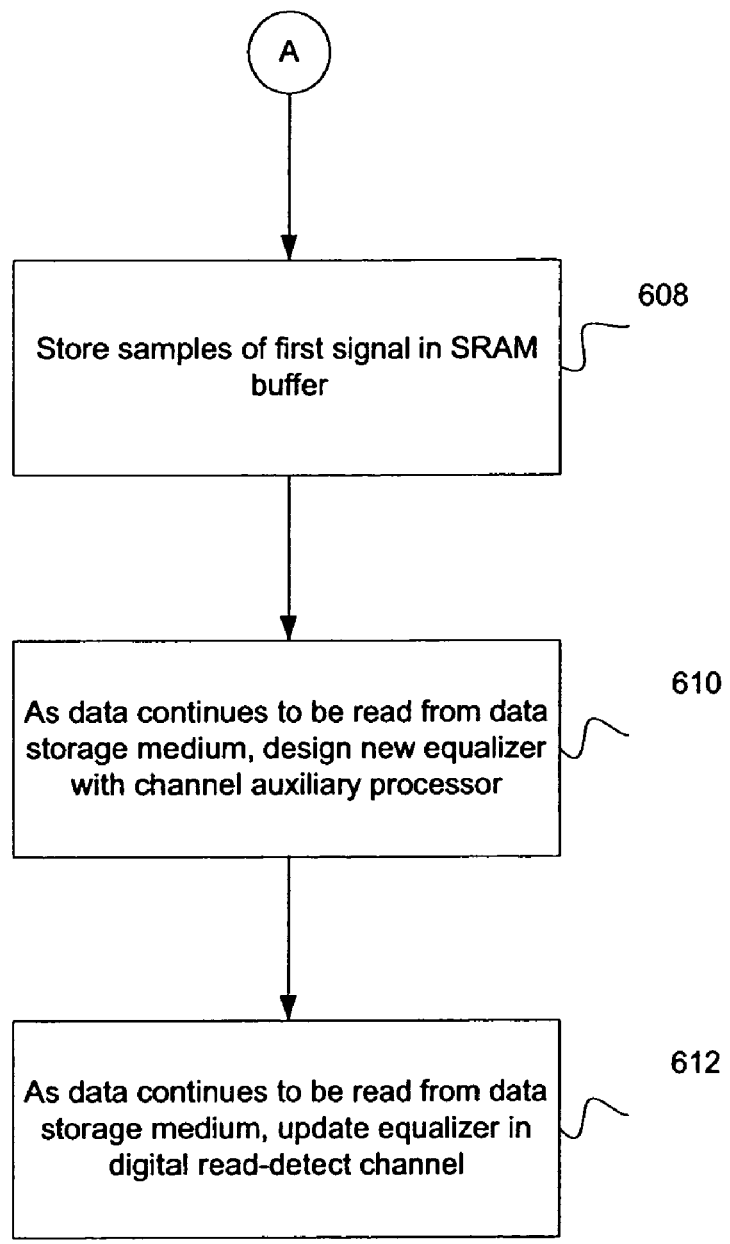

FIGS. 6A and 6B illustrate logic for updating a digital read-detect channel in accordance with certain implementations of the invention. Control begins at block 600 with data (in the form of an analog waveform) being read from a data storage medium 160 by a data storage device 130. In block 602, the analog waveform is converted to a first digital signal by an analog to digital converter. In block 604, the first digital signal is forwarded to a digital read-detect channel 210a, 210b, . . . 210n. In block 606, the digital read-detect channel 210a, 210b, . . . 210n processes the first digital signal with an equalizer 315 and other components (e.g., those in FIGS. 3, 4 and/or 5) to generate a second digital signal, and the second digital signal is forwarded to the data flow 220. In block 608, the channel auxiliary processor 226 stores one or more samples of the first digital signal in SRAM buffer 224.

In block 610, as data continues to be read from the data storage medium 160, a new equalizer 315 is designed in the channel auxiliary processor 226. In certain implementations, the new equalizer 315 is designed by the channel auxiliary processor 226 using the LMS algorithm or matrix inversion techniques. In block 612, as data continues to be read from the data storage medium 160, the channel auxiliary processor 226 updates the equalizer 315. In certain implementations, the equalizer 315 is updated when signals from the data flow 330 and the digital read-detect channel 210a, 210b, . . . 210n indicate that update is appropriate.

In certain implementations, new values are determined for one or more programmable registers (e.g., FIR taps) in the digital read-detect channel, and the one or more programmable registers are updated with the new values.

Figure 7A:
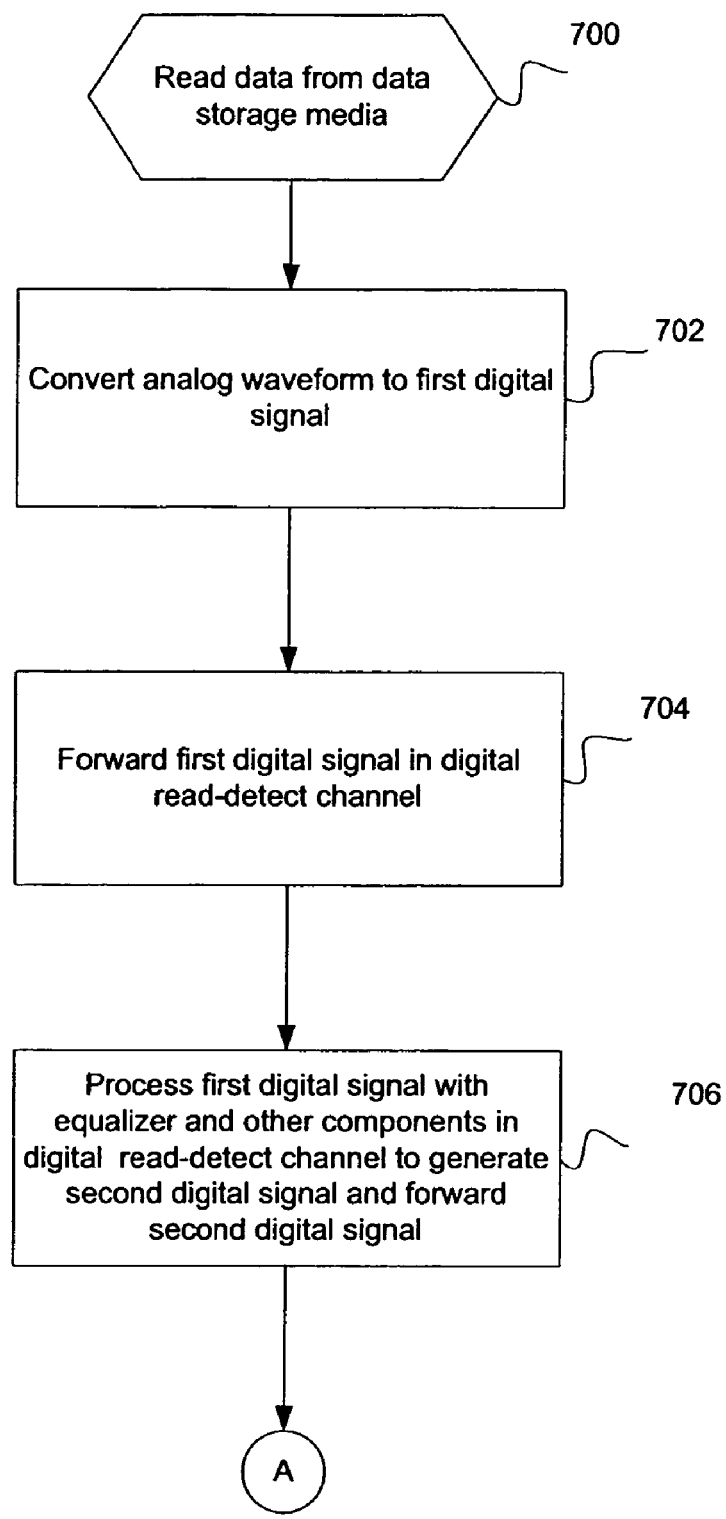
FIGS. 7A and 7B illustrate logic for updating one or more programmable registers (e.g., FIR taps) in accordance with certain implementations of the invention.
Figure 7B:
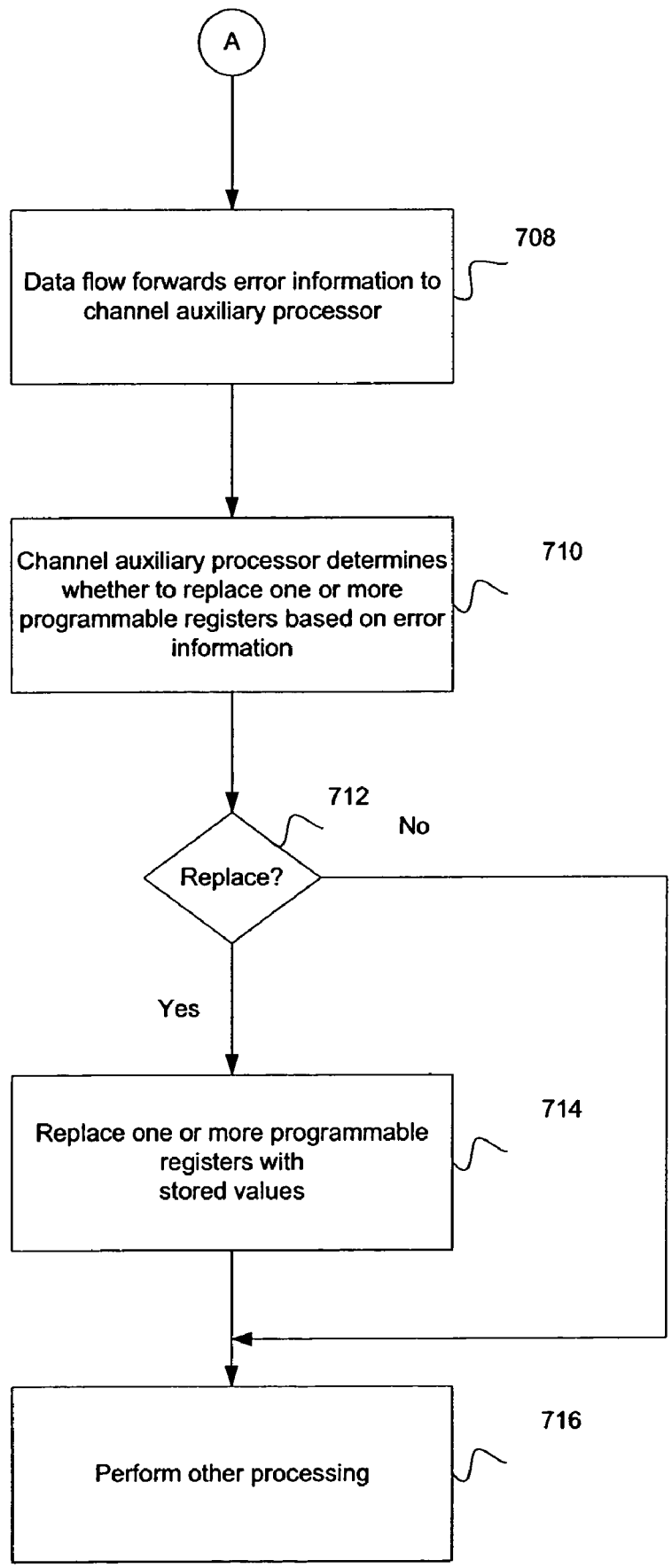

FIGS. 7A and 7B illustrate logic for updating one or more programmable registers (e.g., FIR taps) of an adaptive equalizer in accordance with certain implementations of the invention. An adaptive equalizer may be described as one for which one or more programmable registers (e.g., FIR taps) may be automatically updated, independent of processor or channel auxiliary processor 226 control. In certain implementations, the channel auxiliary processor 226 stores one or more sets of FIR taps into either the SRAM buffer 224 or register space. In certain implementations, the FIR taps may be received from the processor or read from the equalizer after a successful read operation If an existing set of FIR taps are not generating a second digital signal close to the target channel, then, the channel auxiliary processor 226 may replace the existing FIR taps with one of the stored sets of FIR taps. For example, as a storage medium is being read and FIR taps are being adaptively generated, the FIR taps may be stored (e.g., in SRAM buffer 224) if the read operation is successful and the data flow 220 indicates that the error rate is low. Also, the current set of FIR taps that are being replaced may be stored (e.g., in SRAM buffer 224) instead of or in addition to the adaptively generated FIR taps. In certain implementations, the FIR taps may be stored somewhere other than the SRAM buffer 224, such as in hardware registers. For example, in certain implementations, there may be two registers per tap for storage.

In FIG. 7A, control begins at block 700 with data (in the form of an analog waveform) being read from a data storage medium 160 by a data storage device 130. In block 702, the analog waveform is converted to a first digital signal by an analog to digital converter. In block 704, the first digital signal is forwarded to a digital read-detect channel 210a, 210b, ... 210n. In block 706, the digital read-detect channel 210a, 210b ... 210n processes the first digital signal with an adaptive equalizer 315 and other components (e.g., those in FIGS. 3, 4 and/or 5) to generate a second digital signal, and the second digital signal is forwarded to the data flow 220.

In block 708, the data flow 220 forwards error information to channel auxiliary processor 226. In block 710, the channel auxiliary processor 226 determines whether to replace one or more programmable registers (e.g., FIR taps) based on the error information. For example, if the error information indicates that there a large number of errors in the second digital signal that was generated by a digital read-detect channel 210a, 210b, ... 210n, then, the channel auxiliary processor 226 may determine that the values of the one or more programmable registers currently being used are not working effectively. In block 712, it is determined whether the values of the one or more programmable registers are to be replaced. If the values of the one or more programmable registers are to be replaced, processing continues to block 714, otherwise, processing continues to block 716. In block 714, the channel auxiliary processor 226 replaces the current values of the one or more programmable registers with a set of values that are stored, for example in SRAM buffer 224 or hardware registers, when signals from the data flow 220 and the digital read-detect channel 210a, 210b, ... 210n indicate that update is appropriate.

Thus, implementations of the invention allow equalizer design and programmable register (e.g., FIR tap) updates as a data storage medium is being read. Additionally, a single channel auxiliary processor may handle data from multiple channels (e.g., 8, 16, etc.). Implementations of the invention provide a flexible solution, allowing LMS algorithm or matrix inversion techniques to be used for equalizer design, depending upon whether the equalizers are being designed directly with the channel auxiliary processor 226 or hardware adaptive equalizers are being used as the data storage medium is being read. Implementations of the invention also allow other channel processing techniques and drive diagnostic capabilities.

Implementations of the invention provide low-cost solutions that allow digital read-detect channel optimization as a system is reading a data storage medium (e.g., a tape). Additionally, implementations of the invention allow for use of various techniques of equalizer design as well as channel processing capabilities (e.g., implemented using a channel auxiliary processor).

Additional Implementation Details

The described techniques for real-time channel adaptation may be implemented as a method, apparatus or computer program product ("article of manufacture") using standard programming and/or engineering techniques to produce software, firmware, hardware, or any combination thereof. The term "computer program product" or "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 6A, 6B, 7A, and 7B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 6A, 6B, 7A, and 7B may be implemented in software, hardware, programmable and non-programmable gate array logic or in some combination of hardware, software, or gate array logic.

Figure 8:
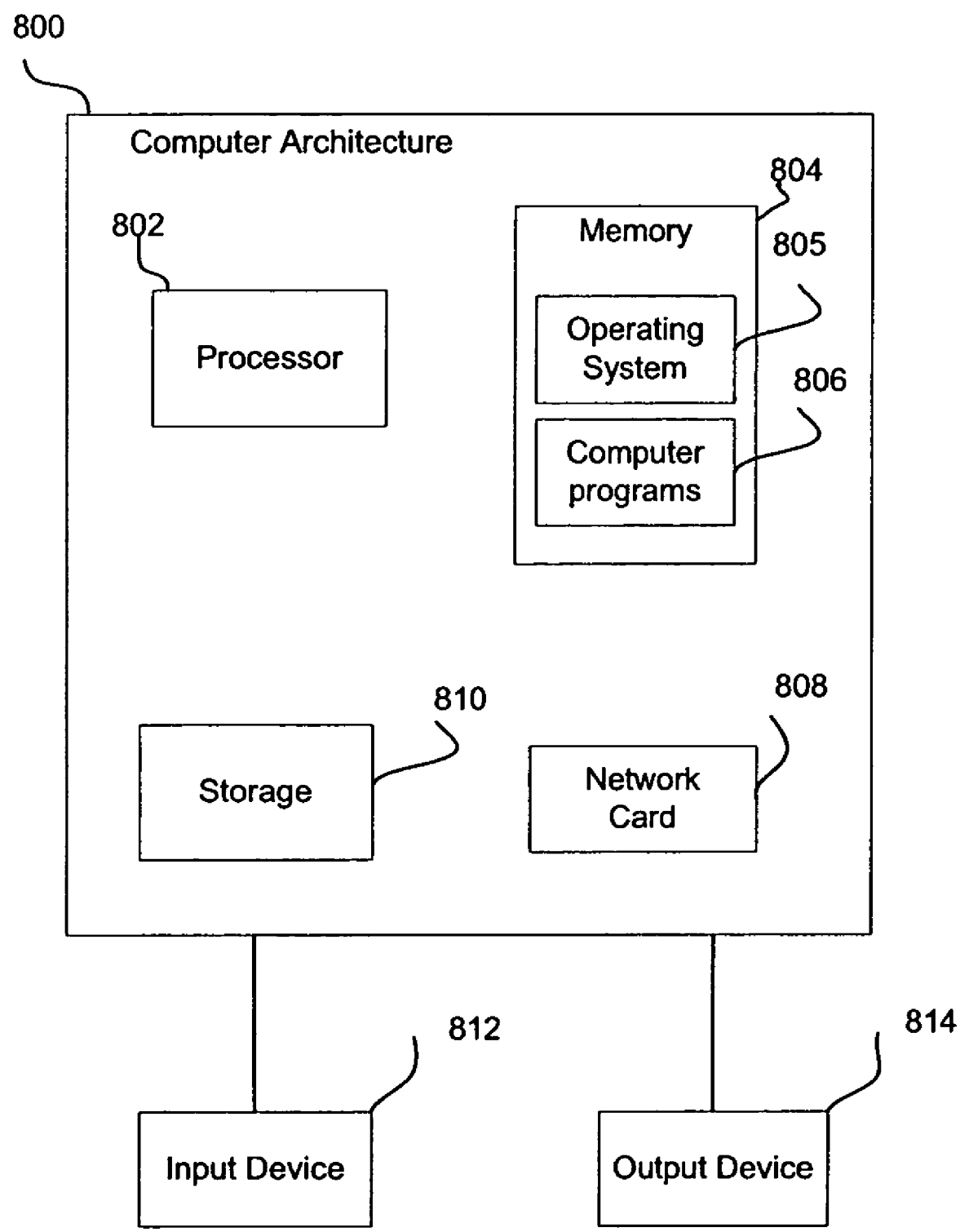
FIG. 8 illustrates an architecture of a computer system that may be used in accordance with certain implementations of the invention.

FIG. 8 illustrates an architecture of a computer system that may be used in accordance with certain implementations of the invention. Host computer 102 and/or data storage and retrieval system 120 may be implemented with computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for updating a read-detect channel, comprising:
    forwarding a first signal directly from an analog to digital converter to a read-detect channel;
    processing the first signal in the read-detect channel that includes an adaptive equalizer and a phase-locked loop, wherein the adaptive equalizer includes one or more programmable registers with coefficients that are used to generate a second signal to match a target channel;
    processing the second signal with a data flow to determine error information, wherein the data flow removes formatting features from data in the second signal, corrects errors in the data, and reformats the data for transmission to a host computer; and
    while the read-detect channel having the adaptive equalizer continues to process additional signals a channel auxiliary processor performs:
        receiving one or more samples of the first signal from the read-detect channel;
        storing the one or more samples in a buffer;
        receiving the error information from the data flow;
        determining whether to dynamically replace values of the one or more programmable registers based on the error information; and
        when it is determined that the values of the one or more programmable registers are to be replaced,
            determining new values for the one or more programmable registers using the one or more samples in the buffer; and
            replacing existing values for the one or more programmable registers with the determined new values.

2. The method of claim 1, further comprising: storing the determined new values for the one or more programmable registers in at least one of a buffer and a register.

3. The method of claim 1, further comprising:
    at the channel auxiliary processor,
        receiving new error information for a third signal output by the read-detect channel; and
        determining whether to replace the values of the one or more programmable registers with stored values based on the new error information, wherein, in response to determining that the new error information indicates that the values of the one or more programmable registers are not generating the third signal close to a target channel, it is determined that the values of the one or more programmable registers currently being used are to be replaced.

4. The method of claim 1, further comprising:
    forwarding the error information from the data flow to the channel auxiliary processor.

5. A system, comprising:
    an analog to digital converter;
    at least one read-detect channel including means for receiving a first signal directly from the analog to digital converter, wherein the at least one read-detect channel includes an adaptive equalizer and a phase-locked loop, wherein the adaptive equalizer includes one or more programmable registers with coefficients that are used to generate a second signal to match a target channel;
    a data flow including means for processing the second signal to determine error information, to remove formatting features from data in the second signal, correct errors in the data, and reformat the data for transmission to a host computer;
    a buffer configured to store one or more samples of the first signal;
    a channel auxiliary processor; and
    while the read-detect channel having the adaptive equalizer continues to process additional signals, means for, at the channel auxiliary processor, determining whether to dynamically replace values of the one or more programmable registers based on the error information from the data flow.

6. The system of claim 5, wherein the read-detect channel processes a signal and further comprising:
    means for determining, with the channel auxiliary processor, new values for the one or more programmable registers; and
    means for replacing existing values for the one or more programmable registers with the determined new values.

7. The system of claim 6, further comprising:
    means for storing a sample of the first signal from the at least one read-detect channel in the buffer; and
    means for determining, with the channel auxiliary processor, the new values for the one or more programmable registers using the sample of the first signal.

8. The system of claim 6, further comprising:
    means for storing the determined new values for the one or more programmable registers in at least one of the buffer and a register.

9. The system of claim 5, further comprising:
    means for receiving the error information for the first signal at the channel auxiliary processor from the data flow.

10. The system of claim 9, farther comprising:
    means for processing the first signal in the at least one read-detect channel to generate the second signal; and
    means for forwarding the error information from the data flow to the channel auxiliary processor.

11. The system of claim 5, further comprising:
    means for replacing the values of the one or more programmable registers with values stored in at least one of the buffer and a register.

12. An article of manufacture comprising a computer readable storage medium including a program for updating a read-detect channel, wherein the program when executed by a processor causes operations to be performed, the operations comprising:
    forwarding a first signal directly from an analog to digital converter to a read-detect channel;
    processing the first signal in the read-detect channel that includes an adaptive equalizer and a phase-locked loop, wherein the adaptive equalizer includes one or more programmable registers with coefficients that are used to generate a second signal to match a target channel;
    processing the second signal with a data flow to determine error information, wherein the data flow removes formatting features from data in the second signal, corrects errors in the data, and reformats the data for transmission to a host computer; and while the read-detect channel having the adaptive equalizer continues to process additional signals a channel auxiliary processor performs:
- receiving one or more samples of the first signal from the read-detect channel;
- storing the one or more samples in a buffer;
- receiving the error information from the data flow;
- determining whether to dynamically replace values of the one or more programmable registers based on the error information; and
- when it is determined that the values of the one or more programmable registers are to be replaced,
    - determining new values for the one or more programmable registers using the one or more samples in the buffer; and
    - replacing existing values for the one or more programmable registers with the determined new values.

13. The article of manufacture of claim 12, wherein the operations further comprise: storing the determined new values for the one or more programmable registers in at least one of a buffer and a register.

14. The article of manufacture of claim 12, wherein the operations further comprise:
at the channel auxiliary processor,
- receiving new error information for a third signal output by the read-detect channel; and
- determining whether to replace the values of the one or more programmable registers with stored values based on the new error information, wherein, in response to determining that the new error information indicates that the values of the one or more programmable registers are not generating the third signal close to a target channel, it is determined that the values of the one or more programmable registers currently being used are to be replaced.

15. The article of manufacture of claim 14, wherein the operations further comprise:
forwarding the error information from the data flow to the channel auxiliary processor.

16. The system of claim 9, farther comprising:
means for, at the channel auxiliary processor,
- receiving new error information for a third signal output by the read-detect channel; and
- determining whether to replace the values of the one or more programmable registers with stored values based on the new error information, wherein, in response to determining that the new error information indicates that the values of the one or more programmable registers are not generating the third signal close to a target channel, it is determined that the values of the one or more programmable registers currently being used are to be replaced.

* * * * *